United States Patent [19]
Waugh

[11] Patent Number: 5,726,553
[45] Date of Patent: Mar. 10, 1998

[54] DUAL BATTERY SYSTEM CONTROL CIRCUIT

[75] Inventor: Iain Wallace Waugh, Hamilton, New Zealand

[73] Assignee: Glory Win International Group Limited, Kowloon, Hong Kong

[21] Appl. No.: 513,213

[22] Filed: Aug. 10, 1995

[30] Foreign Application Priority Data

Aug. 11, 1994 [NZ] New Zealand ............................ 264225

[51] Int. Cl.⁶ .................................................. H01M 10/46
[52] U.S. Cl. ................................ 320/11; 320/12; 320/13
[58] Field of Search ................................ 320/11, 22, 27, 320/6, 15, 39, 40, 56, 8, 12, 13, 21

[56] References Cited

U.S. PATENT DOCUMENTS

| | | | |
|---|---|---|---|
| 5,154,985 | 10/1992 | Tanaka | 429/9 |
| 5,162,164 | 11/1992 | Dougherty et al. | 429/9 |
| 5,164,273 | 11/1992 | Szasz et al. | 429/123 |
| 5,256,502 | 10/1993 | Kump | 429/150 |

OTHER PUBLICATIONS

European Patent Abstracts, Week 9247, p. 114, Abstract of EP 513531–A1, published Nov. 19, 1992.
Japanese Publication 5–258656–A, published Aug. 10, 1993, Abstract only.
Patent Abstracts of Japan, Group M185, vol. 7, No. 9, Published Jan. 14, 1983, Japanese Publication 57–167844, published Oct. 15, 1982, Abstract only.

*Primary Examiner*—Edward Tso
*Attorney, Agent, or Firm*—Seidel Gonda Lavorgna & Monaco, PC

[57] ABSTRACT

Dual batteries having a CRAnking battery and an AUXiliary battery require a switch to the alternator and to disconnect the auxiliaries before the battery becomes depleted. The switch measures the AUXiliary battery's state of charge during alternator charging. The switch opens to prevent overcharging and to preserve the CRAnking battery charge while allowing the AUXiliary battery to discharge preferentially. The switch instructs the alternator to select a burst, float or top up charging voltage depending on the AUXiliary battery state of charge. The switch uses microprocessor control. This utilizes tables to interpret circuit values. A 3-axis graph relates discharge current and voltage with state of charge.

19 Claims, 5 Drawing Sheets

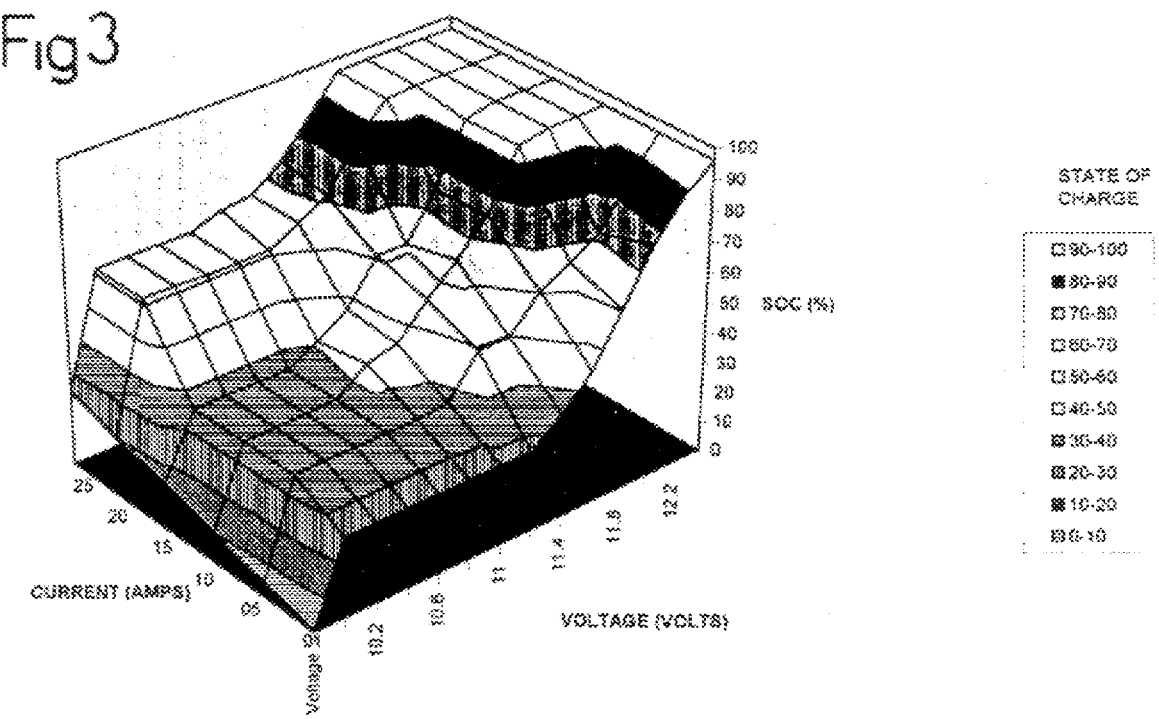

DUAL BATTERY SYSTEM CONTROL CIRCUIT

FIELD OF THE INVENTION

This invention concerns switches used in adapting 2,3 and 4-pole batteries to the wiring loom of a vehicle. Such batteries are used for starting and supplying power to lights, ignition and other loads. The switches are also applicable to separate batteries connected in series, for example, in trucks, and pairs or groups of batteries connected in parallel. These formats are included in the term "2,3 and 4-pole" batteries.

BACKGROUND OF THE INVENTION

In my co-pending application for NZ patent no 244 007\247 509 I describe a switch for automatically controlling the charge and discharge of a 3-pole battery. That system required the adaptation of the wiring loom because conventional looms are designed for a single 2-pole battery.

The art already contains proposals to protect a single 2-pole battery from harmful discharge in order to preserve sufficient charge to start the vehicle. For example, in the event of alternator failure a latching relay disconnects some auxiliaries.

In another proposal, groups of accessories are disconnected by microprocessor control but must be reconnected manually to the single 2-pole battery.

In Japanese patent application 3-49541, A a vehicle battery serves the vehicle requirements while a fax battery drives a fax in the vehicle. The vehicle battery charges the fax battery when ignition is ON. A control device protects the vehicle battery thus ensuring that the car will start.

When the disconnection of auxiliaries and the connection of the appropriate poles to the alternator is under the control of a microprocessor, the state of charge of the battery becomes important because it is this value which determines whether charging occurs when the vehicle is in use or whether discharging occurs when the vehicle is unoccupied.

State of charge is assessable in different ways. Measuring the specific gravity of the battery electrolyte by hydrometer is only useful for determining if the battery is charged or needs charging. It would not measure the quantity of charge remaining which is the crucial value to the switching system.

A carbon pile tester consists of filaments which are calibrated to pass a specified current between battery terminals. A voltmeter indicates the potential difference between the poles. The tester can indicate whether the battery charge is capable of starting a vehicle. Such testers are used by manufacturers to determine whether batteries are defective.

If a battery remains unconnected to a load after being charged, a voltmeter will show the voltage of a fully charged 12v battery typically as 12.60v; whereas a voltage of about 11.80v or less would indicate an almost completely discharged battery.

Many vehicles have a dashboard warning light indicating battery charging failure but this does not indicate the state of charge of the battery.

U.S. Pat. No. 4,902,956 to SLOAN describes a monitor for a 2-pole SLI battery which senses battery voltage and temperature to deduce the state of charge. When this falls below a predetermined value, the monitor disconnects a load in the wiring harness of the vehicle and attempts to preserve sufficient charge to ensure that the vehicle will start.

While the battery terminal voltage can give a reliable indication as to the state of charge when connected to a 30 A load, in this instance 12.65v, a load as small as 100 mA (a boot light) will discharge a battery to the level where it cannot start the vehicle yet the measured voltage may read 11.80v. At the same state of charge and load, smaller batteries may give different voltage readings than larger batteries. SLOAN seeks to overcome this problem by measuring the rate of change of voltage of the vehicle battery. The discharge curve of a lead acid battery voltage supplying constant load is a shallow linear decline until the battery descends to 60–70% when the voltage declines at a greater rate. The monitor's performance uses this characteristic profile which operates regardless of current draw of the load or variations between batteries.

The above method is not useful when the battery is being charged. Most vehicles have a voltage output regulated alternator with a maximum current output typically between 45–100 A. As soon as the vehicle is started, the battery voltage quickly rises to the output voltage of the alternator. This is typically 13.8v–14.4v. If the battery has only a low charge it may receive more than 50 A current. If it were fully charged, it would receive instead a current of less than 1 A. The voltage perceived by a monitor in this charging phase would remain constant.

If batteries are overcharged they lose water needlessly. If they are undercharged continually the plates suffer and may never regain full charge. Recharging of the battery is not 100% efficient and charge current is not directly proportional to the increase in the state of charge of the battery. The charge current needs to be attenuated by the recharge efficiency of the battery.

Quiescent and travelling loads are increasing and it is important to know the state of charge regardless of the size or type of load as a reliable value upon which to base monitor activity.

None of the prior art proposals address the system in which the vehicle has two or more 2-pole, or a 3-pole battery which require preferential charging by the alternator and different preferential discharging to ensure that the functions of the CRA and AUX batteries are maintained utilising comprehensive assessment of the battery's state of charge.

SUMMARY OF THE INVENTION

This invention provides a 2-,3- or 4-pole battery switch for a vehicle with a starter motor, a battery charging generator, and a battery having a CRA battery and an AUX battery wherein the normally open switch R1 connects the CRA and AUX batteries. The switch R1 has sensing means which detect the state of charge of the AUX battery at least during charging in order to:

(a) prevent overcharging and (b) allow the AUX battery to discharge preferentially while still preserving the state of charge of the CRA battery sufficiently to start the vehicle.

The switch preferably preserves separate outputs for cranking and auxiliary functions when the AUX battery state of charge is reduced in order to allow AUX to discharge preferentially while still preserving the CRA battery state of charge sufficiently to start the vehicle.

Preferably the switch detects the state of charge of the AUX battery during both charge and discharge.

The switch may form part of an electrical system in a vehicle as described above being a device for connection between the poles of a battery having:

(a) a normally open switch R1 connecting the CRA and AUX batteries;

(b) a normally closed switch R2 connecting the AUX battery to the electrical auxiliaries;

(c) sensing means which detect the state of charge of the AUX battery and any current from the AUX battery to the CRA battery and in which (i) R1 connects and disconnects the CRA battery and the AUX battery (ii) R2 connects and disconnects the AUX battery to and from the electrical auxiliaries so as to enable the system to charge both CRA and AUX batteries and to meet fluctuating loads.

The sensing means may receive as inputs (a) AUX battery current;

(b) AUX battery voltage;

(c) battery temperature.

The sensing means may be a microprocessor. Current measurement in after market switches may be by Hall Effect or shunt sensors. In original equipment a sensor may be assigned to each load to indicate which is ON or OFF and a LOOK UP table allows the microprocessor to compute the current leaving the AUX battery.

Instead the microprocessor may receive as input only the AUX current value for an identified load, for example, headlights, the microprocessor having data for the total charge capacity of the battery whereby the switch opens when the load has consumed a safe proportion of the total charge capacity.

In the preferred arrangement the current and voltage option is utilized together with the current x time and the temperature values to give a multi input, fail safe assessment of the state of charge. A formula or table yields a value for the state of charge for the microprocessor. This value is useful firstly to disconnect auxiliaries as necessary to prevent the battery from becoming too flat which hinders its recovery. Secondly, when the value indicates a state of charge of 50% it will be more appropriate to charge the battery at about 15.5v. This would charge sulphated plates whereas at lower charging voltages they would remain sulphated. Thus, the microprocessor may instruct the alternator regulator to select a burst charge mode applying about 15.5v or a float charge of about 13.5v. A satisfactory state of charge, namely 75–85% would indicate a top up charge voltage of about 14.5v. The voltage levels may vary by a volt. These and other values are in the literature—Automotive Electric\Electronic Systems C Robert Bosch GmbH 1988 VDI Verlag GmbH.

In practice the sensing means detects a constant voltage whenever the battery is receiving charge. During discharge, the rate of decline in the voltage is directly proportional to current flow. What is needed to manage the system logically is an absolute measurement of the state of charge, not a relative measurement. Therefore, in an alternative arrangement, current may be sensed by a sensor (not a Hall effect component) which measures the rate of change of decline in the battery voltage. This rate indicates current flow.

The temperature is measured by a thermistor or an equivalent.

Where it is possible to fit original equipment the microprocessor may be one of those provided by the vehicle manufacturer for example the engine control microprocessor. This may have a port dedicated to the input of state of charge data onto the buses. In this way spare capacity of a component already included in the vehicle may be utilized at low cost.

BRIEF DESCRIPTION OF THE DRAWINGS

FIG. 3 is a 3 axes graph of SOC\available AUX voltage\available AUX current.

BEST MODE OF CARRYING OUT THE INVENTION

Figure 1:
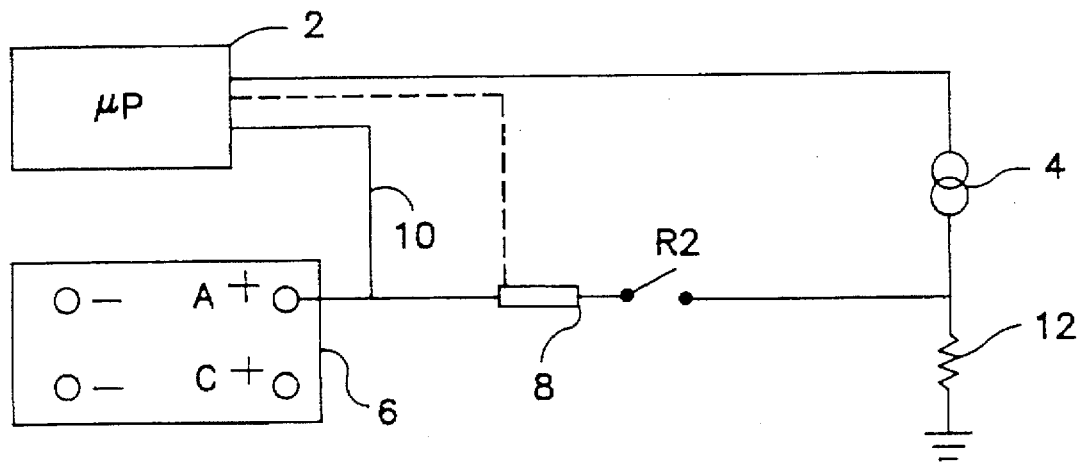
FIG. 1 is a voltage\current option.

Referring to FIG. 1 the microprocessor μP: receives running\not running signals from piezo device 4, current level of the AUX battery 6 by the shunt 8 and AUX voltage through conductor 10. Lights 12 are supplied until the microprocessor μP computes that switch R2 should open.

In a variation each load supplied by the AUX circuit is measured by the microprocessor μP. A lookup table enables the microprocessor μP to compute the current (e.g., lights need 8A. The combination of volts and amps gives a composite state of charge value from which the microprocessor μP computes the cut out value. The comparisons continue regularly until a match cuts the supply to the load. In the event that the vehicle is running, the charging current\volts will be the values being measured. No cut out will occur because the running signal overrides the instruction to cut out.

Figure 2:
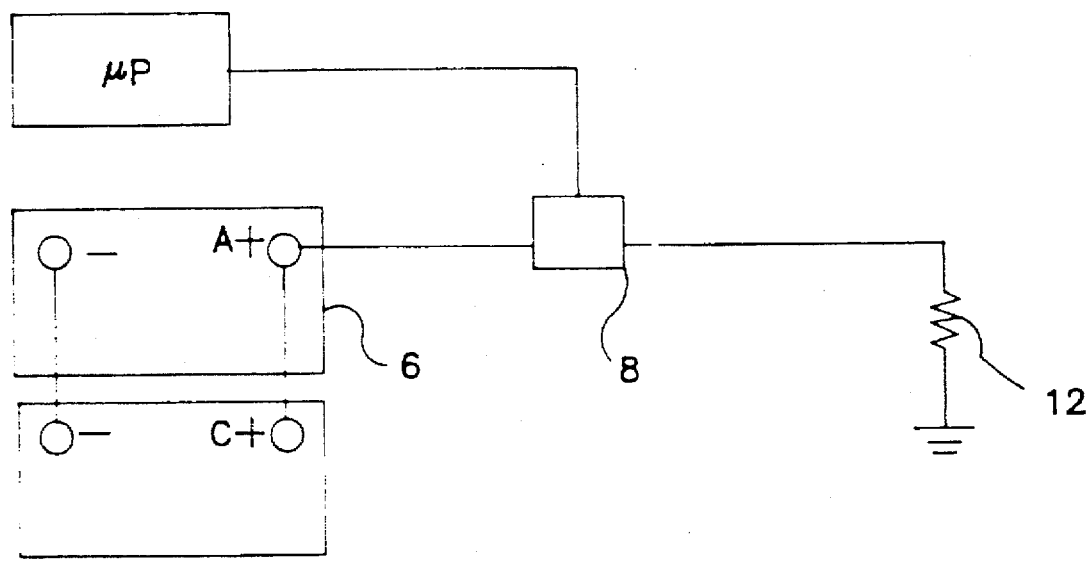
FIG. 2 is a current\time option.

In this way the state of charge determines whether auxiliaries should remain connected. A signal that the vehicle was running would, for example, prevent lights or ignition from being switched off In FIG. 2 the shunt 8 supplies a current value to the microprocessor μP. This measures total current supplied to auxiliaries. The total fully charged amp\hour capacity is an input value to the microprocessor μP (e.g., 30 Ah). The microprocessor μP computes when 15 Ah of current have been supplied through the shunt and opens R1. Thus a current x time signal is utilized. State of charge is not computed as such, only the change in the state of charge.

Table 1 indicates identities given to values used in monitoring battery operation. The microprocessor μP samples the Table values once per second. Thus, values for the AUX current and AUX voltage arrive continually on the serial bus. The microprocessor μP refers to the 3-axes graph shown in FIG. 3 and reads the state of charge.

When the voltage is measured as 11.0 v and the current sensor records 15A as the discharge current, the state of charge lies in the uncolored band corresponding to 40–50% read from the state of charge key.

Figure 4A:
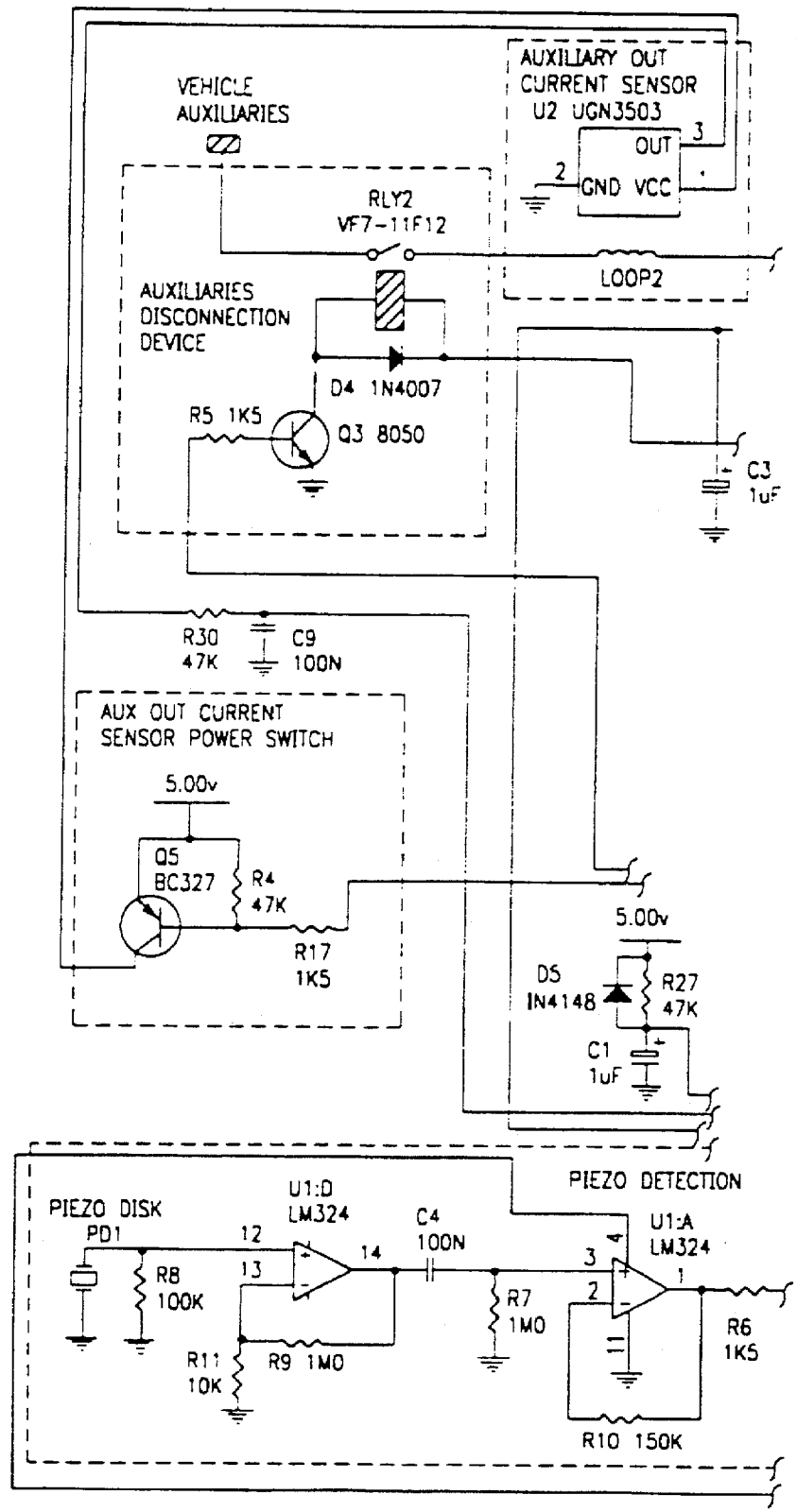
FIG. 4 is a circuit diagram.
Figure 4B:
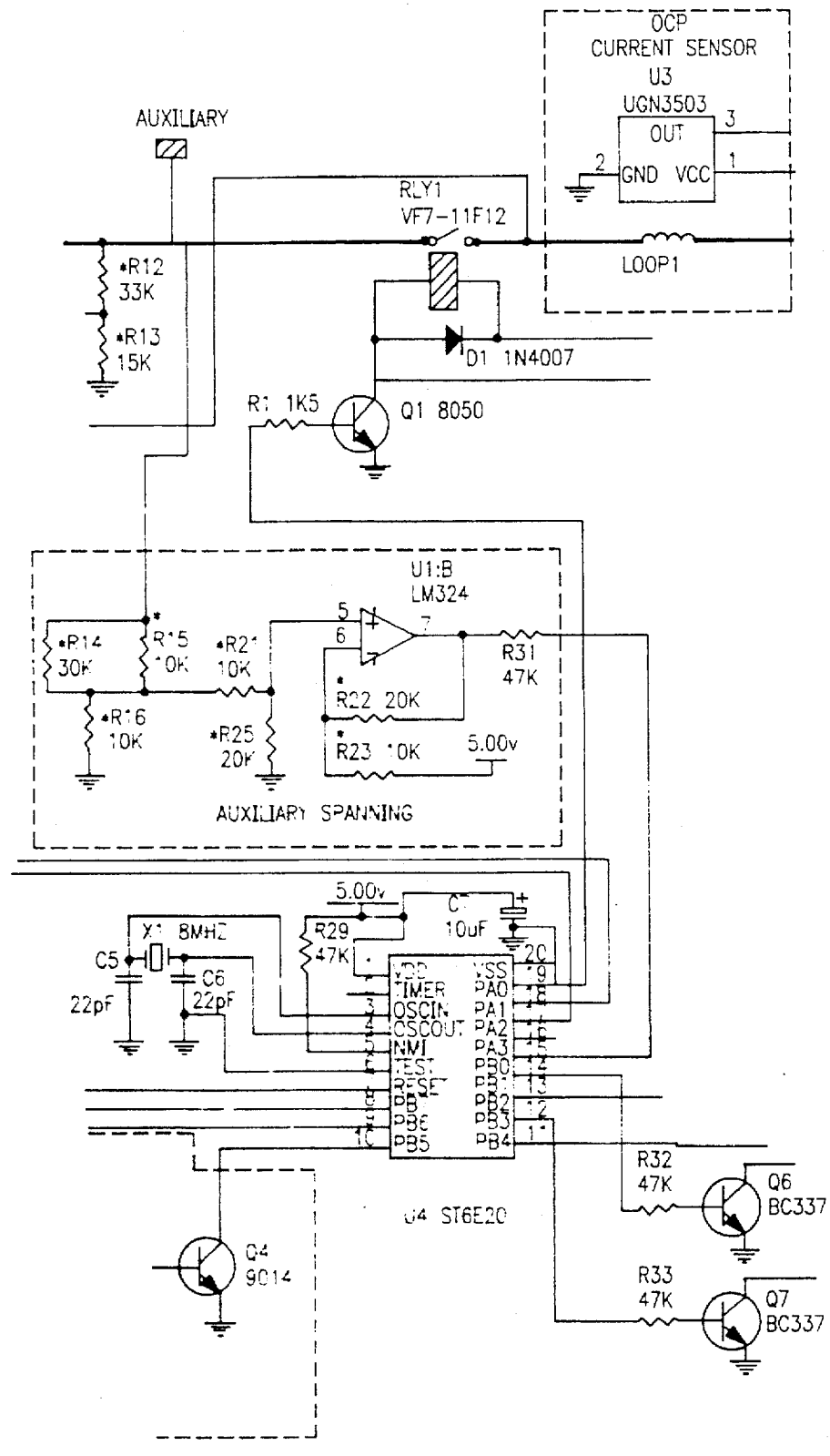
Figure 4C:
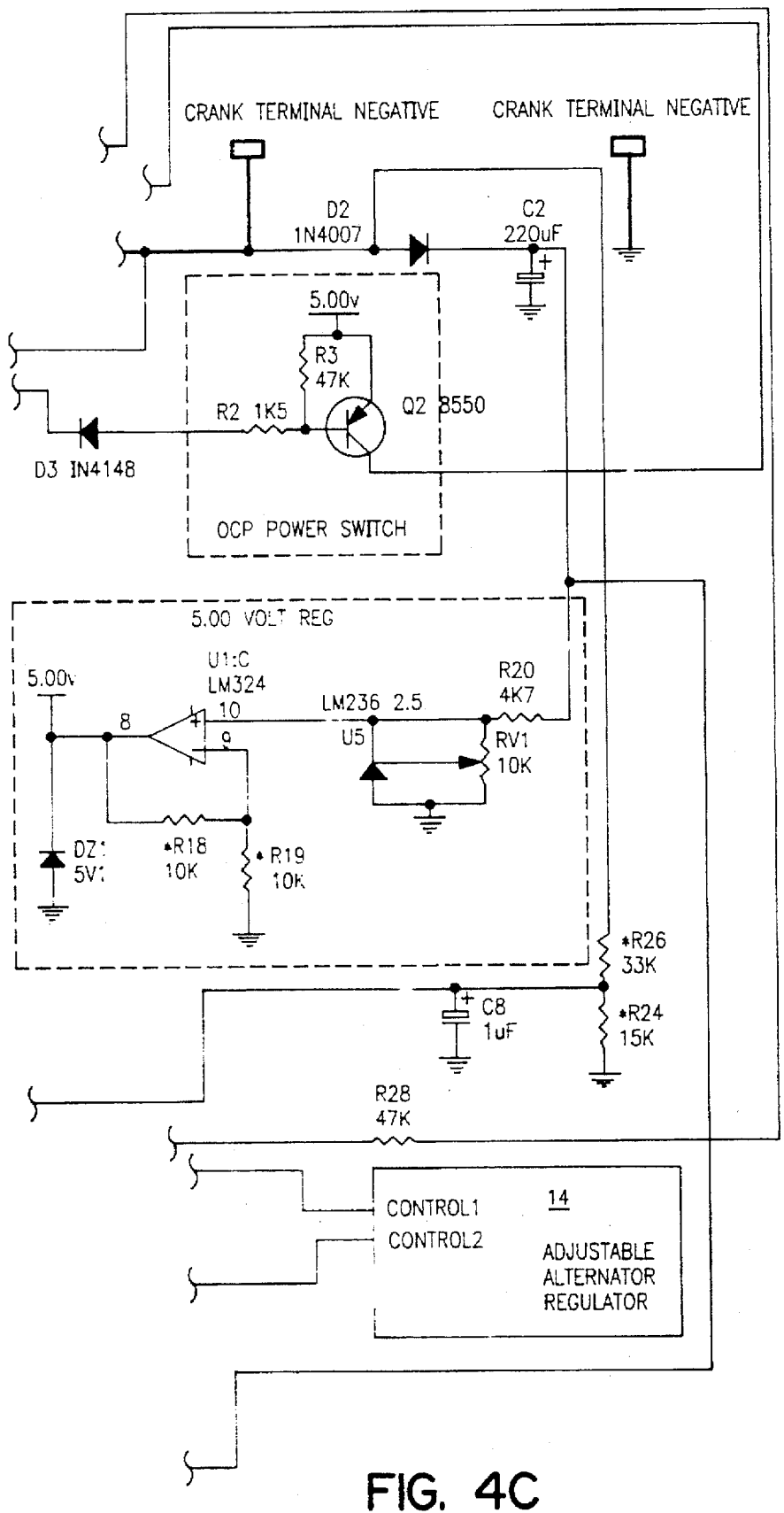

Referring now to FIG. 4, the microprocessor U4 ST6E20 controls relays R1 and R2 and the regulator 14 of the alternator, A burst, float or top up voltage is selected at the regulator.

TABLE 1

Selected Parameters from SAE J1587 Parameter Identification Assignment List

| PID | Parameter |
| --- | --- |
|  | Single data length character |
| 114 | Net Battery Current |
| 115 | Net Alternator Current |
|  | Double data length character |
| 158 | Battery Potential (Voltage) Switched |
| 167 | Alternator Potential (Voltage) |
| 168 | Battery Potential (Voltage) |

I have found the advantages of the system to be:

1. The combination of voltage, current and temperature gives a composite value for the state of charge which is more accurate than the prior art methods.

2. The value obtained by this assessment enables the microprocessor to select a suitable charging voltage at the voltage regulator.

I claim:

1. In a vehicle having a starter motor, a battery charging generator, and a 2, 3, or 4-pole battery with a CRA battery and an AUX battery, a normally open switch connecting the CRA and AUX batteries, the switch being in closed position during battery charging, the switch having a sensor which detects the state of charge of the AUX battery at least during charging to prevent overcharging one of the CRA and AUX batteries by actuating the switch to disconnect the AUX battery from the CRA battery, and to allow the AUX battery to discharge preferentially while preserving the state of charge of the CRA battery sufficiently to start the vehicle.

2. A battery switch for a vehicle as claimed in claim 1 wherein the sensor detects the state of charge during both charge and discharge.

3. A battery switch for a vehicle as claimed in claim 2 where the sensor assesses the rate of declining change in the AUX battery voltage.

4. A battery switch for a vehicle as claimed in claim 3 wherein the sensor assesses the state of charge from the combination of the AUX battery current with the rate of change of voltage decline in the AUX battery.

5. A battery switch for a vehicle as claimed in claim 2 wherein the sensor assesses the state of charge from the combination of the AUX battery voltage and current with constructed data.

6. A battery switch for a vehicle as claimed in claim 5 wherein the constructed data is fuzzy sets, look up tables, or mathematical expressions.

7. A battery switch for a vehicle as claimed in claim 4 wherein the sensor is capable of receiving input from a current measuring sensor for individual vehicle components whereby a composite value for current consumption is utilized.

8. A battery switch for a vehicle as claimed in claim 3 wherein the sensor utilizes a shunt sensor.

9. A battery switch for a vehicle as claimed in claim 3 wherein the sensor utilizes a Hall effect sensor.

10. A battery switch for a vehicle as claimed in claim 3 wherein the sensor utilizes a reference table to assess the current leaving the AUX battery.

11. A battery switch for a vehicle as claimed in claim 2 wherein the sensor receives input from a battery sensor which measures the specific gravity of the battery electrolyte.

12. A battery switch for a vehicle as claimed in claim 11 wherein the sensor receives input in the form of a signal from a light detector which is uncovered by a float.

13. A battery switch for a vehicle as claimed in claim 2 wherein the sensor is a microprocessor.

14. A battery switch for a vehicle as claimed in claim 13 wherein the microprocessor is part of an engine control computer which has a port for input/output.

15. A battery switch for a vehicle as claimed in claim 13 wherein the microprocessor selects a suitable charging voltage for the battery in response to the assessed state of charge.

16. A battery switch for a vehicle as claimed in claim 15 wherein the charge is a burst a float or a top up.

17. A battery switch for a vehicle as claimed in claim 2 wherein the charging current and the discharge current for the AUX battery are summed.

18. A battery switch for a vehicle as claimed in claim 17 wherein the charge current is multiplied by recharge efficiency of the battery.

19. A battery switch for a vehicle as claimed in claim 18 wherein the recharge efficiency varies between 1–100% depending upon the state of charge and battery temperature.

* * * * *